(12) United States Patent
Lee et al.

(10) Patent No.: US 8,865,807 B2
(45) Date of Patent: *Oct. 21, 2014

(54) POLYAMIDE RESIN COMPOSITION HAVING IMPROVED PHYSICAL PROPERTIES INCLUDING THIN-WALL MOLDABILITY

(71) Applicant: Cheil Industries Inc., Gumi-si (KR)

(72) Inventors: Sang Hwa Lee, Gunpo-si (KR); In Sik Shim, Incheon-si (KR); Jong Cheol Lim, Anyang-si (KR); In Geol Baek, Paju-si (KR); Sun Ho Song, Seoul-si (KR); Pil Ho Kim, Gunpo-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/728,177

(22) Filed: Dec. 27, 2012

(65) Prior Publication Data

US 2013/0172453 A1    Jul. 4, 2013

(30) Foreign Application Priority Data

Dec. 29, 2011 (KR) .................. 10-2011-0146044
Dec. 18, 2012 (KR) .................. 10-2012-0148936

(51) Int. Cl.

| | | |
|---|---|---|
| C08G 59/40 | (2006.01) | |
| C08L 77/00 | (2006.01) | |
| C08L 77/06 | (2006.01) | |
| C08G 65/00 | (2006.01) | |
| C08K 5/00 | (2006.01) | |
| C08K 3/32 | (2006.01) | |
| C08K 3/34 | (2006.01) | |
| C08K 3/00 | (2006.01) | |

(52) U.S. Cl.
CPC .............. C08L 77/06 (2013.01); C08L 77/00 (2013.01); *C08K 5/005* (2013.01); *C08K 3/32* (2013.01); *C08K 3/34* (2013.01); *C08L 2205/02* (2013.01); *C08K 3/0033* (2013.01)
USPC ........... 524/106; 524/236; 524/413; 524/417; 524/420; 524/424; 524/425; 524/456

(58) Field of Classification Search
USPC .......... 524/236, 413, 417, 420, 424, 425, 456
See application file for complete search history.

(56) References Cited

U.S. PATENT DOCUMENTS

| | | | |
|---|---|---|---|
| 4,177,185 A | 12/1979 | Tacke et al. | |
| 4,185,044 A | 1/1980 | Tacke et al. | |
| 5,256,718 A | 10/1993 | Yamamoto et al. | |
| 5,849,380 A * | 12/1998 | Kashiba et al. | 428/36.6 |
| 5,863,974 A | 1/1999 | Tjahjadi et al. | |
| 6,506,830 B1 | 1/2003 | Bussi et al. | |
| 8,178,608 B2 | 5/2012 | Nakamura et al. | |
| 8,304,481 B2 | 11/2012 | Nakamura et al. | |
| 2004/0102604 A1* | 5/2004 | Bassler et al. | 528/422 |
| 2004/0175466 A1* | 9/2004 | Douglas et al. | 426/129 |
| 2005/0113532 A1* | 5/2005 | Fish et al. | 525/425 |
| 2008/0146718 A1 | 6/2008 | Gijsman et al. | |
| 2009/0069479 A1 | 3/2009 | Seki | |
| 2010/0113656 A1 | 5/2010 | Saga | |
| 2010/0227957 A1 | 9/2010 | Fujii | |
| 2012/0165448 A1* | 6/2012 | Lee et al. | 524/236 |
| 2012/0305287 A1 | 12/2012 | Ni | |
| 2013/0172453 A1 | 7/2013 | Lee et al. | |
| 2013/0281587 A1* | 10/2013 | Shim et al. | 524/127 |

FOREIGN PATENT DOCUMENTS

| | | |
|---|---|---|
| JP | 1995-228776 | 8/1995 |
| JP | 2000-204244 A | 7/2000 |
| JP | 2002-294070 A | 10/2002 |
| JP | 2004-075994 A | 3/2004 |
| JP | 2007-218980 | 8/2007 |
| KR | 10-2007-0093994 A | 9/2007 |
| WO | 03/085029 A1 | 10/2003 |
| WO | 2012/081801 A1 | 6/2012 |

OTHER PUBLICATIONS

Full Translation of Niguchi et al. JP 2007-218980, pp. 1-32.
International Search Report in commonly owned International Application No. PCT/KR2011/006328 dated Apr. 4, 2012, pp. 1-4.
Office Action in commonly owned U.S. Appl. No. 13/915,655 mailed Mar. 5, 2014, pp. 1-7.
Office Action in commonly owned U.S. Appl. No. 13/332,788 mailed Nov. 28, 2012, pp. 1-8.
Final Office Action in commonly owned U.S. Appl. No. 13/332,788 mailed Jul. 25, 2013, pp. 1-12.
Office Action in commonly owned U.S. Appl. No. 14/067,139 malied May 22, 2014, pp. 1-10.

* cited by examiner

*Primary Examiner* — Terressa Boykin
(74) *Attorney, Agent, or Firm* — Additon, Higgins & Pendleton, P.A.

(57) ABSTRACT

A polyamide resin composition comprises (A) about 10 to about 70% by weight of a crystalline polyamide resin, (B) about 10 to about 70% by weight of an amorphous polyamide resin, (C) about 5 to about 30% by weight of an inorganic filler, and (D) about 10 to about 50% by weight of a white pigment. The polyamide resin composition can have good thin-wall moldability, light reflectance, yellowing resistance, impact strength and heat resistance.

18 Claims, No Drawings

POLYAMIDE RESIN COMPOSITION HAVING IMPROVED PHYSICAL PROPERTIES INCLUDING THIN-WALL MOLDABILITY

CROSS-REFERENCE TO RELATED APPLICATIONS

This application claims priority from Korea Patent Application Nos. 10-2011-0146044, filed on Dec. 29, 2011, and 10-2012-0148936, filed on Dec. 18, 2012, in the Korean Intellectual Property Office, the disclosure of which is incorporated herein by reference in its entirety.

FIELD OF THE INVENTION

The present invention relates to a polyamide resin composition that can have improved thin-wall moldability as well as other physical properties such as light reflectance, impact strength, heat resistance and yellowing resistance.

BACKGROUND OF THE INVENTION

The history of polyamide (PA) resin as an engineering plastic is close to 40 years, yet there still remains a high demand for the same. The continuing demand for polyamide resin is due at least in part to the wide variety of types of polyamide resin, such as PA 6, PA 66, PA 610, PA 612, PA 11, PA 12, PA6T, PA6I, PA9T, and the like, and copolymers or blends thereof, each of which has useful properties and various performance characteristics.

The mechanical properties and heat resistance of polyamide resin can be improved by adding inorganic reinforcing material such as glass fiber. Reinforced polyamide resin compositions can be used in applications such as structural materials and interior and exterior parts of automobiles.

Recently, new light source such as light emitting diodes (LEDs) and electro luminescence (EL) devices is increased as lighting, display and the like since it has low power consumption, long period of life and the like.

Particularly, high heat resistant modified polyamide based resin reinforced by glass fiber and having aromatic rings in the main chain of the modified polyamide based resin, i.e. polyphthalamide (PPA) based resin has been mostly used as a material for the production of various LED components having excellent energy efficiency and energy lifespan, such as reflectors, reflector cups, scramblers, housings and the like. Because the resin can withstand high temperatures used in the production of LED, also exhibit excellent light reflectance with a high whiteness index, minimal deterioration of whiteness resulting from yellowing and can further block the flow of electricity.

Due to environmental regulation, lead-free solders, such as solders made of tin-silver alloy, are increasingly important. Lead-free solders generally have a higher melting point (around 260° C.) than conventional lead-containing solders. Examples of materials applicable in the lead-free solders are limited to liquid crystal polymer (LCP), polyphenylene sulfide (PPS) and polyphthalamide (PPA).

LEDs generally include a semiconductor emitting a light, a lead wire, a reflector as housing, and a transparent sealing product. The reflector can be made of various materials such as ceramic or heat resistant plastics. Ceramics, however, can have problems with productivity, and heat resistant plastics can have reduced optical light reflectance resulting from changes in color that can occur during injection molding process, curing process of sealing product or actually using in the field.

To use polyamide based resin as a material of electronic components such as LEDs, semiconductors and the like, physical properties such as heat resistance, impact strength and the like should not be deteriorated, and thin-wall moldability, light reflectance, yellowing resistance should be improved.

SUMMARY OF THE INVENTION

The present invention provides a polyamide resin composition that can have good thin-wall moldability. The present invention also provides a polyamide resin composition that can have good light reflectance. The present invention further provides a polyamide resin composition that can have good yellowing resistance. The present invention furthermore provides a polyamide resin composition that can have good thin-wall moldability, light reflectance and/or yellowing resistance, without deteriorating mechanical properties such as heat resistance, impact strength and the like.

The polyamide resin composition of the present invention may comprise (A) about 10 to about 70% by weight of a crystalline polyamide resin, (B) about 10 to about 70% by weight of an amorphous polyamide resin, (C) about 5 to about 30% by weight of an inorganic filler, and (D) about 10 to about 50% by weight of a white pigment, each based on the total weight (about 100% by weight) of (A), (B), (C), and (D).

The polyamide resin composition of the present invention may further comprise (E) about 0.01 to about 2 parts by weight of a light stabilizer based on about 100 parts by weight of (A) to (D).

The polyamide resin composition of the present invention may further comprise (F) about 0.01 to about 2 parts by weight of a sodium phosphate salt based on about 100 parts by weight of (A) to (D).

The crystalline polyamide resin (A) of the present invention may have a repeating unit derived from a dicarboxylic acid including an aromatic dicarboxylic acid and an aliphatic diamine, a cycloaliphatic diamine, or a combination thereof.

The crystalline polyamide resin (A) of the present invention may have a melting point of more than about 200° C. and a repeating unit represented by following Chemical Formula 3.

[Chemical Formula 3]

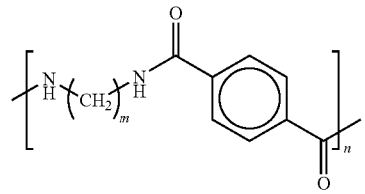

In the above Chemical Formula 3, m is an integer ranging from 4 to 12 and n is an integer ranging from 50 to 500.

The crystalline polyamide resin (A) of the present invention may have a crystallization temperature of about 260 to about 320° C. and a glass transition temperature of less than about 130° C. measured by differential scanning calorimetry (DSC).

The amorphous polyamide resin (B) of the present invention can have a glass transition temperature of about 110 to about 200° C. measured by differential scanning calorimetry (DSC).

The amorphous polyamide resin (B) of the present invention may comprise a polyamide prepared from terephthalic acid and 2,2,4-trimethyl hexamethylene diamine or 2,4,4-trimethyl hexamethylene diamine; polyamide prepared from isophthalic acid and 1,6-hexamethylene diamine; copolyamide prepared from a combination of terephthalic acid/isophthalic acid and 1,6-hexamethylene diamine; copolyamide prepared from isophthalic acid, 3,3'-dimethyl-4,4'-diamino dicyclohexyl methane and laurolactam or lactam; polyamide prepared from 1,12-dodecandioic acid and 4,4'-diamino dicyclohexyl methane; copolyamide prepared from a combination of terephthalic acid/isophthalic acid, 3,3'-dimethyl-4,4'-diamino dicyclohexyl methane and laurolactam; or a combination thereof.

The inorganic filler (C) of the present invention may comprise glass fiber, wollastonite, potassium titanate whisker, aluminum boric acid whisker, zinc oxide whisker, calcium whisker, or a combination thereof.

The inorganic filler (C) of the present invention may have an average length of about 0.1 to about 11 μm.

The white pigment (D) of the present invention may comprise titanium oxide, zinc oxide, zinc sulfide, white lead, zinc sulfate, barium sulfate, calcium carbonate, aluminum oxide, or a combination thereof.

The light stabilizer (E) of the present invention may comprise a benzophenone-based compound, a salicylate-based compound, a benzotriazole-based compound, an acrylonitrile-based compound, a hindered amine-based compound, a hindered phenol-based compound, or a combination thereof.

The sodium phosphate salt (F) of the present invention may comprise sodium monohydrogen phosphate, sodium dihydrogen phosphate, sodium phosphate, sodium acid pyrophosphate, sodium pyrophosphate, or a combination thereof.

The polyamide resin composition of the present invention may have an initial light reflectance measured at a 440 nm wavelength light of more than about 92%, a light reflectance reduction measured at a wavelength of 440 nm after the specimen is illuminated by a LED light source for 200 hours under constant temperature and humidity conditions, and in particular in an oven at a temperature of 85° C. and relative humidity of 85% of less than about 5%, and a change of yellow index (ΔYI) measured after the specimen is illuminated by a LED light source for 200 hours under constant temperature and humidity conditions, and in particular in an oven at a temperature of 85° C. and relative humidity of 85% of less than about 3.

The polyamide resin composition of the present invention may have a spiral flow length measured at a molding temperature of 130° C. and injection temperature 330° C. in a metallic mold having a helical form cavity with dimensions of 5 mm×0.5 mm of more than about 100 mm.

The polyamide resin composition of the present invention may have an Izod impact strength of more than about 2 kgf·cm/cm measured in accordance with ASTM D256 using a specimen with a thickness of ⅛ inch.

The polyamide resin composition of the present invention may have a HDT of more than about 200° C. in accordance with ASTM D648 using a specimen with a thickness of ¼ inch under a pressure of 1.82 MPa.

DETAILED DESCRIPTION OF THE INVENTION

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention relates to a polyamide resin composition that can have improved thin-wall moldability as well as physical properties such as impact strength, heat resistance, light reflectance and/or yellowing resistance.

The polyamide resin composition of the present invention comprises (A) about 10 to about 70% by weight of a crystalline polyamide resin, (B) about 10 to about 70% by weight of an amorphous polyamide resin, (C) about 5 to about 30% by weight of an inorganic filler, and (D) about 10 to about 50% by weight of a white pigment.

(A) Crystalline Polyamide Resin

The crystalline polyamide resin (A) can include aromatic rings in the main chain thereof and may be produced by polycondensation of dicarboxylic acid including about 10 to about 100 mol % of an aromatic dicarboxylic acid and an aliphatic diamine, an cycloaliphatic diamine, or a combination thereof.

Examples of the aromatic dicarboxylic acids may include without limitation terephthalic acid (TPA) represented by the following Chemical Formula 1, isophthalic acid (IPA) represented by the following Chemical Formula 2, and the like, and combinations thereof.

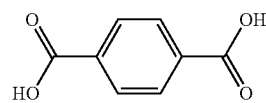

Terephthalic acid (TPA)   [Chemical Formula 1]

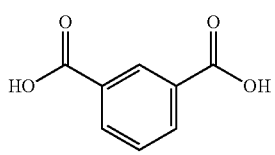

Isophthalic acid (IPA)   [Chemical Formula 2]

The aliphatic or the cycloaliphatic diamine has about 4 to about 20 carbon atoms.

In exemplary embodiments, the crystalline polyamide resin (A) is represented by Chemical Formula 3:

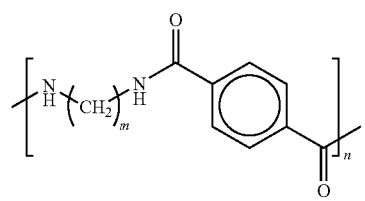

[Chemical Formula 3]

In the above Chemical Formula 3, m is an integer ranging from 4 to 12 and n is an integer ranging from 50 to 500.

Examples of the crystalline polyamide resin (A) include without limitation PA6T (m is 6), PA10T (m is 10), and the like, and combinations thereof. The PA6T is prepared by polycondensation of hexamethylene diamine and terephthalic acid. The PA10T is prepared by polycondensation of 1,10-decane diamine and terephthalic acid.

Other examples of the crystalline polyamide resin (A) comprise without limitation polyhexamethylene terephthalamide (PA6T), polycaproamide/polyhexamethylene terephthalamide copolymer (PA6/6T), polyhexamethylene adipamide/polyhexamethylene terephthalamide copolymer (PA66/6T), polyhexamethylene adipamide/polyhexamethylene isophthalamide copolymer (PA66/6I), polyhexamethylene terephthalamide/polyhexamethylene isophthalamide copolymer (PA6T/6I), polyhexamethylene terephthalamide/polydodecanamide copolymer (PA6T/12), polyhexamethylene adipamide/polyhexamethylene terephthalamide/polyhexamethylene isophthalamide copolymers (PA66/6T/6I), polyhexamethylene terephthalamide/poly(-2-methylpentamethylene terephthalamide) copolymers (PA 6T/PAM5T), polynonamethylene terephthalamide (PA9T), polydecamethylene terephthalate (PA10T), and the like, and combinations thereof.

The crystalline polyamide resin (A) can have a melting point of more than about 200° C., for example about 260 to about 350° C., and as another example about 290 to about 335° C., as measured by differential scanning calorimetry (DSC). Also, the crystalline polyamide resin (A) can have a crystallization temperature of about 260 to about 320° C., for example about 270 to about 300° C., measured by differential scanning calorimetry (DSC). The crystalline polyamide resin (A) can have the glass transition temperature of about less than 130° C. measured by differential scanning calorimetry (DSC). When the melting point and the crystallization temperature are within the above range, the crystalline polyamide resin can have good heat resistance.

Examples of the crystalline polyamide resin (A) having the above features comprise without limitation C3200 made by Mitsui Chemical Company (Japan) and A4002 made by Solvay Company (Belgium).

The thermoplastic resin composition of the present invention may comprise the crystalline polyamide resin (A) in an amount of about 10 to about 70% by weight, based on about 100% by weight of the crystalline polyamide resin (A), the amorphous polyamide resin (B), the inorganic filler (C) and the white pigment (D). In some embodiments, the polyamide resin composition can include the crystalline polyamide resin (A) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the crystalline polyamide resin (A) may be present in an amount of from about any of the foregoing amounts to about any other of the foregoing amounts.

(B) Amorphous Polyamide Resin

The amorphous polyamide resin (B) may be prepared using the following monomers:

a linear or branched diamine having 6 to 14 carbon atoms, for example 1,6-hexamethylene diamine, 2-methyl-1,5-diamino pentane, 2,2,4-trimethyl hexamethylene diamine, 2,4,4-trimethylhexamethylene diamine, 1,9-nonamethylene diamine, 1,10-decamethylene diamine, 1,12-dodecamethylene diamine, and the like, and combinations thereof;

a cycloaliphatic diamine having 6 to 22 carbon atoms, for example 4,4'-diamino dicyclohexyl methane, 3,3'-dimethyl-4,4'-diamono dicyclohexyl methane, 4,4'-diamino dicyclohexyl-2,2-propane, 1,4-diaminocyclohexane, 1,4-bis(amonomethyl)cyclohexane, bis(aminomethyl)norbornane, 3-aminomethyl-3,5,5-trimethyl cyclohexyl amine, and the like, and combinations thereof;

an aromatic aliphatic diamine having 6 to 22 carbon atoms, for example m-xylene diamine, p-xylene diamine, 2,2-bis(4-aminophenyl)propane, and the like, and combinations thereof;

a linear or branched aliphatic dicarboxylic acid having 6 to 22 carbon atoms, for example adipic acid, 2,2,4-trimethyl adipic acid, 2,4,4-trimethyl adipic acid, azelaic acid, sebacic acid, 1,12-dodecanedioic acid, and the like, and combinations thereof;

a cycloaliphatic dicarboxylic acid having 6 to 22 carbon atoms, for example cyclohexane-1,4-dicarboxylic acid, 4,4'-dicarboxy cyclohexyl propane, 1,4-bis(carboxy methyl)cyclohexane, and the like, and combinations thereof;

an aromatic aliphatic dicarboxylic acid having 8 to 22 carbon atoms, for example diphenylmethane-4,4'-dicarboxylic acid; an aromatic dicarboxylic acid having 8 to 22 carbon atoms, for example isophthalic acid, tert-butyl isophthalic acid, terephthalic acid, 1,4-naphthalene dicarboxylic acid, 1,5-naphthalene dicarboxylic acid, 2,6-naphthalene dicarboxylic acid, 2,7-naphthalene dicarboxylic acid, diphenic acid, diphenyl ether-4,4'-dicarboxylic acid, and the like, and combinations thereof; and a lactam or a laurolactam having 6 to 12 carbon atoms, ω-aminodicarboxylic acid, ε-caprolactam, ε-aminocaproic acid, ω-aminododecanoic acid, and the like, and combinations thereof.

In exemplary embodiments, examples of the amorphous polyamide resin (B) may comprise without limitation a polyamide prepared from terephthalic acid and 2,2,4-trimethyl hexamethylene diamine or 2,4,4-trimethyl hexamethylene diamine; polyamide prepared from isophthalic acid and 1,6-hexamethylene diamine; copolyamide prepared from a combination of terephthalic acid/isophthalic acid and 1,6-hexamethylene diamine; copolyamide prepared from isophthalic acid, 3,3'-dimethyl-4,4'-diamino dicyclohexyl methane and laurolactam or lactam; polyamide prepared from 1,12-dodecandicarboxylic acid and 4,4'-diamino dicyclo methane; and copolyamide prepared from a combination of terephthalic acid/isophthalic acid, 3,3'-dimethyl-4,4'-diamino dicyclohexyl methane and laurolactam; and the like, and combinations thereof.

The amorphous polyamide resin (B) may have a glass transition temperature of about 110 to about 200° C., for example about 140 to about 180° C., as measured by differential scanning calorimetry (DSC).

Examples of the amorphous polyamide resin (B) having the above features comprise without limitation CX7323 made by Evonik Company (Germany) and G170 made by ARKEMA Company (France).

The thermoplastic resin composition of the present invention may comprise the amorphous polyamide resin (B) in an amount of about 10 to about 70% by weight, based on about 100% by weight of the crystalline polyamide resin (A), the amorphous polyamide resin (B), the inorganic filler (C) and the white pigment (D). In some embodiments, the polyamide resin composition can include the amorphous polyamide resin (B) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amorphous polyamide resin (B) may be present in an amount of from about any of the foregoing amounts to about any other of the foregoing amounts.

(C) Inorganic Filler

The polyamide resin composition of the present invention may comprise an inorganic filler (C) in various forms, such as but not limited to fiber, powder, particle, flake, needle, cloth, mat, and the like, and combinations thereof, in order to improve mechanical properties, heat resistance and dimensional stability of the resin composition.

In the present invention, any conventional inorganic filler can be used. Exemplary inorganic filler (C) includes without limitation carbon fiber, glass fiber, boron fiber, glass bead, glass flake, carbon black, diatomaceous earth, clay, kaolin, talc, mica, calcium carbonate, filler in needle form, and the like, and combinations thereof. Examples of filler in needle form include without limitation glass fiber, wollastonite, potassium titanate whisker, aluminum boric acid whisker, zinc oxide whisker, calcium whisker, and the like, and combinations thereof.

When the polyamide resin composition includes the inorganic filler (C), an article prepared from the polyamide resin composition can have good mechanical properties, such as tensile strength, flexural strength and flexural modulus, and heat resistance, such as heat deflection temperature (HDT).

In the micro molding field such as thin-wall molding of resin composition, it is important to provide a high-flow resin composition. In exemplary embodiments, the polyamide resin composition of the present invention may comprise wollastonite to improve the thin-wall moldability. When the wollastonite is used in the micro molding field such as applications requiring less than about 1 mm of thickness for thin-wall molding of resin composition, good heat resistance and mechanical properties of the base resin may be maintained and the thin-wall moldability can be improved.

The wollastonite may have an average length of about 0.1 to about 11 μm. The wollastonite may have an apparent density of about 0.1 to about 2 g/cm$^3$, for example about 0.1 to about 1 g/cm$^3$. The cross section of the wollastonite may be quadrangle as but the shape of the wollastonite is not limited and can vary and be selected by the skilled artisan, depending on the end use of the composition.

The inorganic filler (C) can be coated with an organic compound to improve the adhesion with the polyamide resin. In exemplary embodiments, wollastonite, glass fiber, potassium titanate whisker and/or aluminum boric acid whisker can be used to provide high whiteness.

The thermoplastic resin composition of the present invention may comprise the inorganic filler (C) in an amount of about 5 to about 30% by weight, based on about 100% by weight of the crystalline polyamide resin (A), the amorphous polyamide resin (B), the inorganic filler (C) and the white pigment (D). In some embodiments, the polyamide resin composition can include the inorganic filler (C) in an amount of about 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the inorganic filler (C) may be present in an amount of from about any of the foregoing amounts to about any other of the foregoing amounts.

(D) White Pigment

The polyamide resin composition of the present invention may comprise a white pigment (D) (which is not the same as the inorganic filler (C)) to minimize the yellowing and impart good light reflectance.

Examples of the white pigment (D) may include without limitation titanium oxide, zinc oxide, zinc sulfide, white lead, zinc sulfate, barium sulfate, calcium carbonate, aluminum oxide and the like. The white pigment may be used alone or in combinations thereof.

Further, the white pigment may be surface treated with a coupling agent, such as a silane coupling agent, titanium coupling agent, and the like, and combinations thereof. Examples of the coupling agent may include without limitation vinyltriethoxysilane, 3-aminopropyltriethoxysilane, 3-glycidoxypropyltriethoxysilane, and the like, and combinations thereof.

In exemplary embodiments, the white pigment may be titanium dioxide (TiO$_2$), which can improve optical properties such as light reflectance and hiding properties. Any conventional titanium dioxide may be used for the titanium dioxide of the present invention. The titanium dioxide is not limited to any particular method of making the same, and conventional preparation methods may be used. Further, the titanium dioxide of the present invention is not limited by particle size.

In exemplary embodiments, titanium dioxide treated by an inorganic and/or organic surface treatment agent can be used. Examples of the inorganic surface treatment agent can include without limitation aluminum oxide (alumina, Al$_2$O$_3$), silicon dioxide (silica, SiO$_2$), zircon dioxide (zirconia, ZrO$_2$), sodium silicate, sodium aluminate, sodium aluminosilicate, zinc oxide, mica and the like. The inorganic surface treatment agent may be used alone or in combinations thereof. Examples of the organic surface treatment agent can include without limitation polydimethylsiloxane, trimethylpropane (TMP), pentaerythritol and the like. The organic surface treatment agent may be used alone or in combinations thereof.

The titanium dioxide may be coated with less than about 5 parts by weight of the inorganic or organic surface treatment agent, based on about 100 parts by weight of titanium dioxide. In exemplary embodiments, the titanium dioxide may be coated with less than about 2 parts by weight of Al$_2$O$_3$ as an inorganic surface treatment agent, based on about 100 parts by weight of titanium dioxide.

The titanium dioxide coated by the Al$_2$O$_3$ can be further coated by another inorganic surface treatment agent such as but not limited to SiO$_2$, ZrO$_2$, sodium silicate, sodium aluminate, sodium aluminosilicate, mica and the like and combinations thereof, and/or an organic surface treatment agent such as but not limited to polydimethylsiloxane, trimethylpropane (TMP), pentaerythritol and the like, and combinations thereof.

The thermoplastic resin composition of the present invention may comprise the white pigment (D) in an amount of about 10 to about 50% by weight, based on about 100% by weight of the crystalline polyamide resin (A), the amorphous polyamide resin (B), the inorganic filler (C) and the white pigment (D). In some embodiments, the polyamide resin composition can include the white pigment (D) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the white pigment (D) may be present in an amount of from about any of the foregoing amounts to about any other of the foregoing amounts.

When the amount of the white pigment (D) is less than about 10% by weight, the light resistance may be deteriorated. When the amount of the white pigment (D) is more than about 50% by weight, the impact resistance may be deteriorated.

(E) Light Stabilizer

The polyamide resin composition of the present invention may further comprise a light stabilizer (E) to prevent discoloration and inhibit decline of light reflectance. Examples of the light stabilizer may include without limitation compounds able to absorb UV such as benzophenone-based compounds, salicylate-based compounds, benzotriazole-based compounds, acrylonitrile-based compounds, other resonance structure containing compounds and the like; compounds able to capture radicals such as hindered amine-based compounds, hindered phenol-based compounds and the like; and combinations thereof. A compound that has high solubility in a mixture of the crystalline polyamide resin (A) and the amorphous polyamide resin (B), excellent heat resistance, and amide bonds in the molecule can be used. Also, using both a compound able to absorb UV and a compound able to capture radicals can improve light stability.

Depending on the effect of preventing discoloration and inhibiting reduction of light reflectance of the polyamide resin composition, the polyamide resin composition may further comprise the light stabilizer (E) in an amount of about 0.01 to about 2 parts by weight, for example about 0.1 to about 2 parts by weight, based on about 100 parts by weight of the crystalline polyamide resin (A), the amorphous polyamide resin (B), the inorganic filler (C) and the white pigment (D). In some embodiments, the polyamide resin composition can include the light stabilizer (E) in an amount of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, or 2 parts by weight. Further, according to some embodiments of the present invention, the light stabilizer (E) may be present in an amount of from about any of the foregoing amounts to about any other of the foregoing amounts.

(F) Sodium Phosphate Salt

The polyamide resin composition of the present invention may further comprise a sodium phosphate salt (F) to impart good light reflectance as well as thermo-discoloration stability, hydrolysis stability and light stability of the polyamide resin composition. When using both the white pigment (D) and the sodium phosphate salt (F), the polyamide resin composition may have good whiteness as well as thermo-discoloration stability. The polyamide resin composition may have good light reflectance since the sodium phosphate salt (F) can have excellent whiteness. Also, the polyamide resin composition may have good thermo-discoloration stability and hydrolysis stability since the polyamide resin composition comprises the sodium phosphate salt (F) which has good thermo-discoloration stability and hydrolysis stability.

Examples of the sodium phosphate salt (F) can include without limitation sodium monohydrogen phosphate, sodium dihydrogen phosphate, sodium phosphate, sodium acid pyrophosphate, sodium pyrophosphate, and the like, and combinations thereof. The sodium phosphate salt (F) may be used alone or in combinations thereof.

Also, the sodium phosphate salt (F) can eliminate acid which may be generated in the molding process using the polyamide resin composition, so that thermo-discoloration stability and hydrolysis stability can be improved.

The sodium phosphate salt (F) is not limited by particle size. The sodium phosphate salt can be treated with surface treatment agent to improve compatibility thereof with the polyamide resin and the dispersion of the sodium phosphate salt in the polyamide resin matrix.

Examples of surface treatment agents can include without limitation silane coupling agents such as silane, epoxy silane and the like, titanium coupling agents, organic acids, polyols, silicones and the like, and combinations thereof.

The thermoplastic resin composition of the present invention may further comprise the sodium phosphate salt (F) in an amount of about 0.01 to about 2 parts by weight, for example about 0.1 to about 2 parts by weight, based on about 100 parts by weight of the crystalline polyamide resin (A), the amorphous polyamide resin (B), the inorganic filler (C) and the white pigment (D). In some embodiments, the polyamide resin composition can include the sodium phosphate salt (F) in an amount of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, or 2 parts by weight. Further, according to some embodiments of the present invention, the sodium phosphate salt (F) may be present in an amount of from about any of the foregoing amounts to about any other of the foregoing amounts.

When the amount of the sodium phosphate salt (F) is less than about 0.01 parts by weight, the light reflectance of the resin composition may be deteriorated. When the amount of sodium phosphate salt (F) is more than about 2 parts by weight, the impact strength and yellowing resistance of the resin composition may be deteriorated.

(G) Additive(s)

The polyamide resin composition of the present invention may further comprise one or more additive(s) such as but not limited to fluorescence brightening agents, lubricants, release agents, nucleating agents, antistatic agents, stabilizers, reinforcing materials, inorganic additives, colorants such as dyes or pigments, and the like, and combinations thereof. The additive(s) can be used in conventional amounts, so long as the additives do not significantly compromise other desired properties of the resin composition. The skilled artisan can readily select the types and amounts of additives without undue experimentation depending on the use of the compositions and the desired additional properties thereof.

The fluorescence brightening agents may play a role of enhancing light reflectance of the polyamide resin composition. Exemplary fluorescence brightening agents include without limitation stilbene-bis benzoxazole derivatives such as 4-(2-benzoxazolyl)-4'-(5-methyl-2-benzoxazolyl)stilbene, 4,4'-bis(2-benzoxazolyl)stilbene, and the like, and combinations thereof.

Exemplary release agents include without limitation polymers containing fluorine, silicone oils, metal salts of stearic acid, metal salts of montanic acid, ester waxes of montanic acid, polyethylene waxes, and the like, and combinations thereof.

Exemplary nucleating agents include without limitation talc, clay, and the like, and combinations thereof.

The polyamide resin composition of the present invention may have a spiral flow length measured under a molding temperature of 130° C. and injection temperature 330° C. in a metallic mold having a helical form cavity with dimensions of 5 mm×0.5 mm of more than about 100 mm.

The polyamide resin composition of the present invention may have an initial light reflectance measured at a 440 nm wavelength light of more than about 92%, a light reflectance reduction measured at a 440 nm wavelength light after the specimen is illuminated by a LED light source for 200 hours under constant temperature and humidity conditions, and in particular in an oven at a temperature of 85° C. and relative humidity of 85% of less than about 5%, and a change of yellow index ($\Delta YI$) measured after the specimen is illuminated by a LED light source for 200 hours under constant temperature and humidity conditions, and in particular in an oven at a temperature of 85° C. and relative humidity of 85% of less than about 3.

The polyamide resin composition of the present invention may have an Izod impact strength of more than about 2 kgf·cm/cm measured in accordance with ASTM D256 using a specimen with a thickness of ⅛ inch.

The polyamide resin composition of the present invention may have a heat deflection temperature (HDT) of more than about 200° C. in accordance with ASTM D648 using a specimen with a thickness of ¼ inch under a pressure of 1.82 MPa.

Accordingly, the polyamide resin composition of the present invention can be used in articles requiring good thin-wall moldability, in addition to good light reflectance, heat resistance, impact strength, and yellowing resistance. Further, the polyamide resin composition of the present invention can exhibit excellent light reflectance and impact strength by including proper amounts of the white pigment (D) and sodium phosphate salt (F), and also heat resistance and hydrolysis resistance may also be improved with minimal decline in the light reflectance and minimal yellowing exhibited by the composition after exposure to the proceeding constant temperature and constant humidity (i.e., 85° C. and 85% of relative humidity). Therefore, the polyamide resin composition of the present invention can be used as a LED reflector material which is continuously exposed to a high temperature and high humidity environment.

The polyamide resin composition of the present invention can be adapted not only for LED applications, but also for other applications reflecting light beams. For example, it is possible to use the polyamide resin composition as a material for a reflector for a light emitting device such as various electrical/electronic products, indoor lighting, indicators, outdoor lighting, automobile lighting, display apparatus, headlights, and the like.

The invention may be better understood by reference to the following examples which are intended for the purpose of illustration and are not to be construed as in any way limiting the scope of the present invention, which is defined in the claims appended hereto.

EXAMPLES

The specifications of each component in the following examples and comparative examples are as given below.

(A) Crystalline Polyamide Resin (A1) PA10T

A crystalline polyamide resin (PA10T) including aromatic rings in the main chain prepared by polycondensation of terephthalic acid and 1,10-decanediamine is used. The crystalline polyamide resin has a melting point of about 315° C., a crystallization temperature of about 280° C., and glass transition temperature of about 120° C. measured by DSC.

(A2) PA6T

A crystalline polyamide resin (PA6T) including aromatic rings in the main chain prepared by polycondensation of terephthalic acid and hexamethylene diamine is used. The crystalline polyamide resin has a melting point of about 325° C., a crystallization temperature of about 295° C., and a glass transition temperature of about 90° C. measured by DSC.

(B) Amorphous Polyamide Resin

An amorphous polyamide resin made by Arkema Company of France (product name: G170) is used. The amorphous polyamide resin has a glass transition temperature of about 158° C. measured by DSC and does not have a crystallization temperature.

(C) Inorganic Filler (C1) A wollastonite made by NYCO Company of U.S.A. (product name: NYAD 5000) is used. The wollastonite has an average length of about 2.2 μm and an apparent density of about 0.77 g/cm³.

(C2) A wollastonite made by NYCO Company of U.S.A. (product name: NYGLOS 12) is used. The wollastonite has an average length of about 12 μm and an apparent density of about 0.60 g/cm³.

(D) White Pigment

A titanium dioxide made by KRONOS Company of U.S.A. (product name: KRONOS 2233) is used.

(E) Light Stabilizer

A light stabilizer made by BASF Company of Germany (product name: CHIMASSORB 944) is used.

(F) Sodium Phosphate Salt

A sodium acid pyrophosphate made by Innophos Company is used.

Examples 1 to 7 and Comparative Examples 1 to 4

The components in amounts shown in the following Table 1 are extruded through a conventional extruder heated about 240 to about 350° C. and pellets for resin composition are prepared. After drying the prepared pellets at a temperature of 130° C. for more than 5 hours, a specimen is prepared using an injection molding machine heated about 240 to about 330° C.

In the following Table 1, the amounts of (A), (B), (C) and (D) are based on about 100% by weight of (A), (B), (C) and (D), and the amounts of (E) and (F) are based on about 100 parts by weight of (A), (B), (C) and (D).

TABLE 1

| | | Examples | | | | | | | Comparative Examples | | | |
|---|---|---|---|---|---|---|---|---|---|---|---|---|
| | | 1 | 2 | 3 | 4 | 5 | 6 | 7 | 1 | 2 | 3 | 4 |
| (A) | (A1) | 50 | 55 | 50 | 55 | 50 | 55 | — | 55 | 60 | 45 | 50 |
| | (A2) | — | — | — | — | — | — | 50 | — | — | — | — |
| (B) | | 10 | 5 | 10 | 5 | 10 | 5 | 5 | 5 | — | 5 | 10 |
| (C) | (C1) | 10 | 10 | 10 | 10 | 5 | 25 | 10 | — | 10 | 40 | — |
| | (C2) | — | — | — | — | — | — | — | — | — | — | 10 |
| (D) | | 30 | 30 | 30 | 30 | 35 | 15 | 35 | 40 | 30 | 10 | 30 |
| (E) | | — | 1 | 1 | 1 | 1 | 0.5 | 0.5 | 1 | 2 | 2 | 1 |
| (F) | | — | — | 0.5 | 1 | 2 | 2 | 2 | 1 | 1 | 1 | 2 |

Physical properties are measured by the following method and the results are shown in Table 2:

(1) Melting point ($T_m$, ° C.): Using a DSC7 made by Perkin Elemer Company, the temperature is maintained at 330° C. for 5 minutes, the temperature is decreased to 23° C. at a rate of 10° C./min and the temperature is increased at a rate of 10° C./min. Heat absorption peak when dissolved is determined as the melting point.

(2) Crystallization temperature ($T_c$, ° C.): Using a DSC7 made by Perkin Elemer Company, the temperature is maintained at 330° C. for 5 minutes. The peak of phase transition temperature, which occurs while the temperature is decreased to 23° C. at a rate of 10° C./min, is determined as the crystallization temperature.

(3) Glass transition temperature ($T_g$, ° C.): Using a DSC7 made by Perkin Elemer Company, the temperature is maintained at 330° C. for 5 minutes, the temperature is decreased to 23° C. at a rate of 10° C./min and the temperature is increased at a rate of 10° C./min. Second-order endothermic transition point before melting point is determined as the glass transition temperature.

(4) Thin-wall moldability (spiral flow length, m): Using an injection machine made by Sumitomo Company, resin is injected under a molding temperature of 130° C. and injection temperature 330° C. using a metallic mold having a helical form cavity with dimensions of 5 mm×0.5 mm. The spiral flow length is determined as a length of molded product.

(5) Heat resistance (HDT, ° C.): The HDT is measured in accordance with ASTM D648 using a specimen with a thickness of ¼ inch under a pressure of 1.82 MPa.

(6) Light reflectance (%): Initial light reflectance (SCI, specular component included) at a wavelength of 440 nm is measured according to CIE Lab color difference evaluation criteria using a Minolta 3600D spectrophotometer, and then light reflectance is measured again after maintaining the specimen under conditions temperature of 85° C. and 85% relative humidity for 200 hours. The reduction in light reflectance is evaluated.

(7) Yellow index (YI): Initial yellow index is measured according to CIE Lab color difference evaluation criteria using a Minolta 3600D spectrophotometer, and then is measured again after maintaining the specimen under conditions of 85° C. and 85% relative humidity for 200 hours. The change of yellow index (ΔYI) is evaluated.

(8) Izod impact strength (kgf·cm/cm): The Izod impact strength is measured in accordance with ASTM D256 using a specimen with a thickness of ⅛ inch.

TABLE 2

|  |  | Examples | | | | | | | Comparative Examples | | | |
| --- | --- | --- | --- | --- | --- | --- | --- | --- | --- | --- | --- | --- |
|  |  | 1 | 2 | 3 | 4 | 5 | 6 | 7 | 1 | 2 | 3 | 4 |
| Spiral flow length | | 120 | 110 | 125 | 110 | 145 | 105 | 105 | 105 | 86 | 85 | 75 |
| HDT | | 209 | 217 | 211 | 215 | 202 | 245 | 240 | 145 | 201 | 260 | 248 |
| Light reflectance | Initial | 94.9 | 93.6 | 94.4 | 94.2 | 94.0 | 93.9 | 93.5 | 93.5 | 89.5 | 82.4 | 92.8 |
| | After 200 hours | 91.1 | 90.5 | 91.8 | 92.2 | 92.3 | 92.2 | 90.5 | 91.5 | 84.2 | 80.0 | 90.5 |
| | Change of light reflectance | 3.8 | 3.1 | 2.6 | 2.0 | 1.7 | 1.7 | 3.0 | 2.0 | 5.3 | 2.4 | 2.3 |
| YI | Initial | 4.3 | 4.0 | 4.2 | 4.1 | 3.7 | 3.8 | 3.9 | 3.4 | 6.3 | 4.3 | 4.9 |
| | After 200 hours | 7.2 | 6.1 | 5.2 | 5.4 | 5.5 | 5.4 | 5.2 | 4.8 | 7.5 | 5.9 | 6.5 |
| | Change of YI | 2.9 | 2.1 | 1.0 | 1.3 | 1.8 | 1.6 | 1.3 | 1.4 | 1.2 | 1.6 | 1.6 |
| Izod impact strength | | 3.3 | 3.1 | 3.4 | 3.2 | 3.5 | 3.5 | 3.2 | 3.0 | 3.1 | 4.8 | 4.2 |

As shown in Table 2, compared to Comparative Examples 2 and 4, Examples 1 to 4 including both the crystalline polyamide resin (A) and the amorphous polyamide resin (B) and the wollastonite having an average length of about 0.1 to about 11 μm and an apparent density of about 0.1 to about 2 g/cm³, the thin-wall moldability is improved.

Example 3 further including the light stabilizer (E) and the sodium phosphate salt (F) in the polyamide resin composition of Example 1, and Example 4 further including the sodium phosphate salt (F) in the polyamide resin composition of Example 2 does not deteriorate the heat resistance and the impact strength, and improve the thin-wall moldability, light reflectance and yellowing resistance.

However, in Comparative Example 1 without the inorganic filler (C1) of the present invention, the heat resistance is deteriorated. In Comparative Example 3, which includes the inorganic filler (C1) in an amount outside of the range of the present invention, the thin-wall moldability and the initial light reflectance are deteriorated.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A polyamide resin composition comprising:
    (A) about 10 to about 70% by weight of a crystalline polyamide resin;
    (B) about 10 to about 70% by weight of an amorphous polyamide resin;
    (C) about 5 to about 30% by weight of an inorganic filler;
    (D) about 10 to about 50% by weight of a white pigment; and
    (F) about 0.01 to about 2 parts by weight of a sodium phosphate salt based on about 100 parts by weight of the crystalline polyamide resin (A), the amorphous polyamide resin (B), the inorganic filler (C) and the white pigment (D).

2. The polyamide resin composition of claim 1, wherein the polyamide resin composition further comprises (E) about 0.01 to about 2 parts by weight of a light stabilizer based on about 100 parts by weight of the crystalline polyamide resin (A), the amorphous polyamide resin (B), the inorganic filler (C) and the white pigment (D).

3. The polyamide resin composition of claim 1, wherein the crystalline polyamide resin (A) has a repeating unit derived from a dicarboxylic acid including an aromatic dicarboxylic acid and an aliphatic diamine, cycloaliphatic diamine, or a combination thereof.

4. The polyamide resin composition of claim 1, wherein the crystalline polyamide resin (A) has a melting point of more than about 200° C. and a repeating unit represented by following Chemical Formula 3:

[Chemical Formula 3]

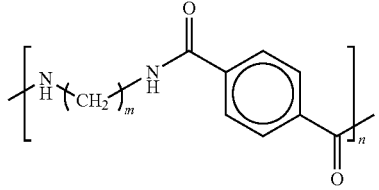

wherein in the above Chemical Formula 3, m is an integer ranging from 4 to 12 and n is an integer ranging from 50 to 500.

5. The polyamide resin composition of claim 1, wherein the crystalline polyamide resin (A) has a crystallization temperature of about 260 to about 320° C. measured by differential scanning calorimetry (DSC) and a glass transition temperature of less than about 130° C. measured by differential scanning calorimetry (DSC).

6. The polyamide resin composition of claim 1, wherein the amorphous polyamide resin (B) has a glass transition temperature of about 110 to 200° C. measured by differential scanning calorimetry (DSC).

7. The polyamide resin composition of claim 1, wherein the amorphous polyamide resin (B) comprises a polyamide prepared from terephthalic acid and 2,2,4-trimethyl hexamethylene diamine or 2,4,4-trimethyl hexamethylene diamine ; polyamide prepared from isophthalic acid and 1,6-hexamethylene diamine; copolyamide prepared from a combination of terephthalic acid/isophthalic acid and 1,6-hexamethylene diamine; copolyamide prepared from isophthalic acid, 3,3'-dimethyl-4,4'-diamino dicyclohexyl methane and laurolactam or lactam; polyamide prepared from 1,12-dodecandioic acid and 4,4'-diamino dicyclohexyl methane; copolyamide prepared from a combination of terephthalic acid/isophthalic acid, 3,3'-dimethyl-4,4'-diamino dicyclohexyl methane and laurolactam; or a combination thereof.

8. The polyamide resin composition of claim 1, wherein the inorganic filler (C) comprises glass fiber, wollastonite, potassium titanate whisker, aluminum boric acid whisker, zinc oxide whisker, calcium whisker, or a combination thereof.

9. The polyamide resin composition of claim 1, wherein the inorganic filler (C) has an average length of about 0.1 to about 11 μm.

10. The polyamide resin composition of claim 1, wherein the white pigment (D) comprises titanium oxide, zinc oxide, zinc sulfide, white lead, zinc sulfate, barium sulfate, calcium carbonate, aluminum oxide, or a combination thereof.

11. The polyamide resin composition of claim 2, wherein the light stabilizer (E) comprises a benzophenone-based compound, a salicylate-based compound, a benzotriazole-based compound, an acrylonitrile-based compound, a hindered amine-based compound, a hindered phenol-based compound, or a combination thereof.

12. The polyamide resin composition of claim 1, wherein the sodium phosphate salt (F) comprises sodium monohydrogen phosphate, sodium dihydrogen phosphate, sodium phosphate, sodium acid pyrophosphate, sodium pyrophosphate, or a combination thereof 13. The polyamide resin composition of claim 1, wherein the polyamide resin composition has a spiral flow length measured under a molding temperature of 130° C. and injection temperature 330° C. in a metallic mold having a helical form cavity with dimensions of 5 mm×0.5 mm of more than about 100 mm.

14. The polyamide resin composition of claim 1, wherein the polyamide resin composition has an initial light reflectance measured at a 440 nm wavelength light of more than about 92%, a light reflectance reduction measured at a 440 nm wavelength light after the specimen is illuminated by a LED light source for 200 hours under temperature of 85° C. and relative humidity of 85% of less than about 5%, and a change of yellow index (ΔYI) measured after the specimen is illuminated by a LED light source for 200 hours under temperature of 85° C. and relative humidity of 85% of less than about 3.

15. The polyamide resin composition of claim 1, wherein the polyamide resin composition has an Izod impact strength of more than about 2 kgf·cm/cm measured in accordance with ASTM D256 using a specimen with a thickness of ⅛ inch.

16. The polyamide resin composition of claim 1, wherein the polyamide resin composition has a HDT of more than about 200° C. measured in accordance with ASTM D648 using a specimen with a thickness of ¼ inch under a pressure of 1.82 MPa.

17. An article prepared from the polyamide resin composition of claim 1.

18. The article of claim 17, wherein the article is a reflector for a LED.

* * * * *